Oct. 29, 1968   J. C. SHENSTONE ET AL   3,408,467
DIRECTIONAL SIGNAL SWITCH
Filed Oct. 24, 1965
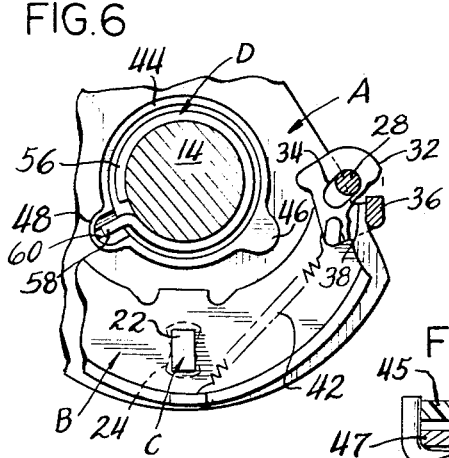
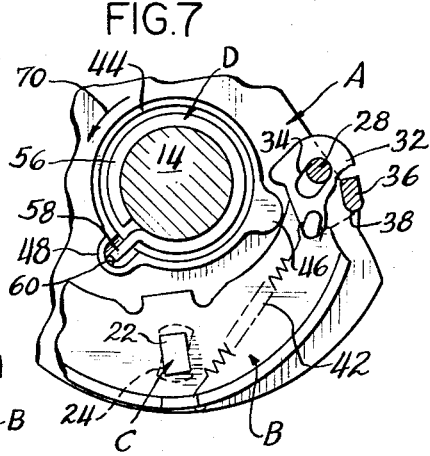
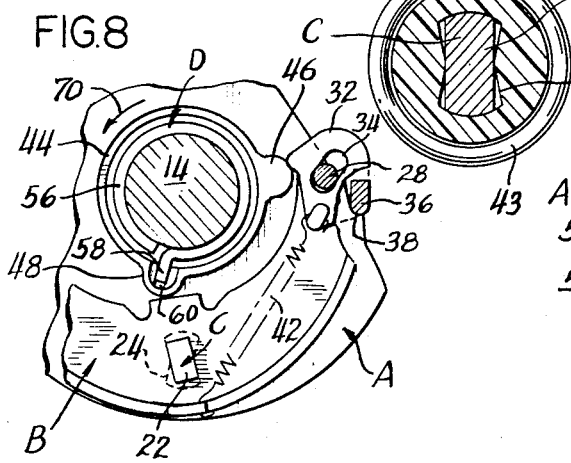
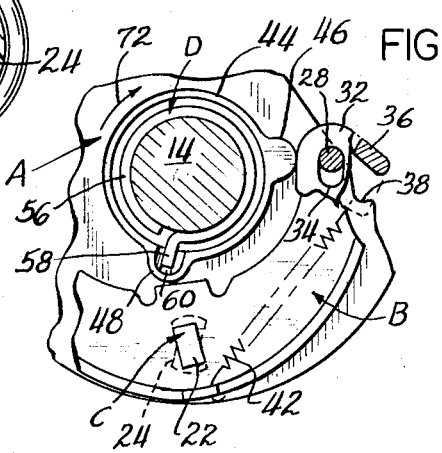
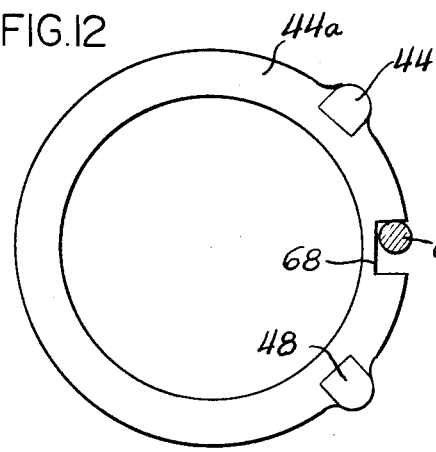
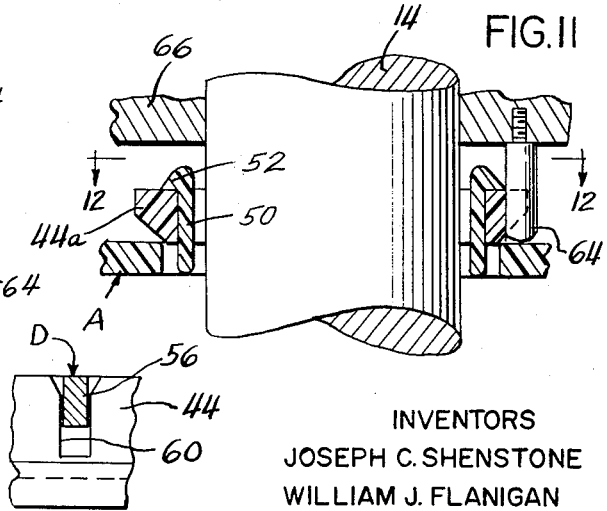
INVENTORS
JOSEPH C. SHENSTONE
WILLIAM J. FLANIGAN
BY Bair, Freeman & Molinare
ATTORNEYS 3,408,467
DIRECTIONAL SIGNAL SWITCH
Joseph C. Shenstone, Detroit, and William J. Flanigan, Pontiac, Mich., assignors to Essex Wire Corporation, Fort Wayne, Ind., a corporation of Michigan
Filed Oct. 24, 1965, Ser. No. 504,326
6 Claims. (Cl. 200—61.27)

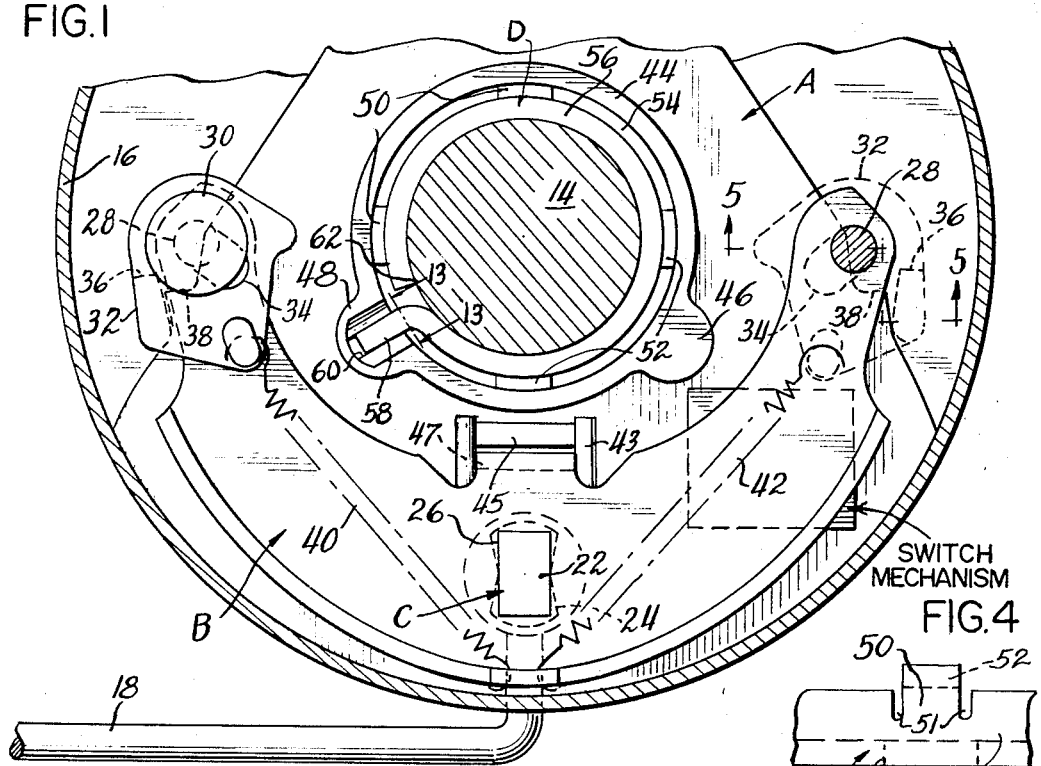
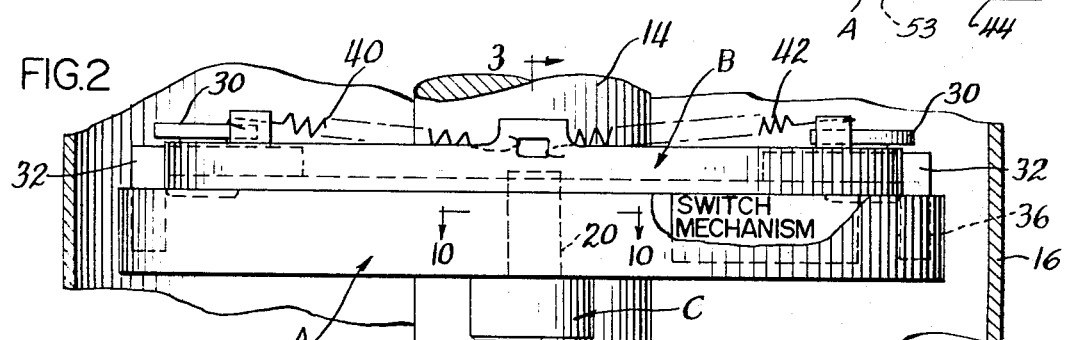
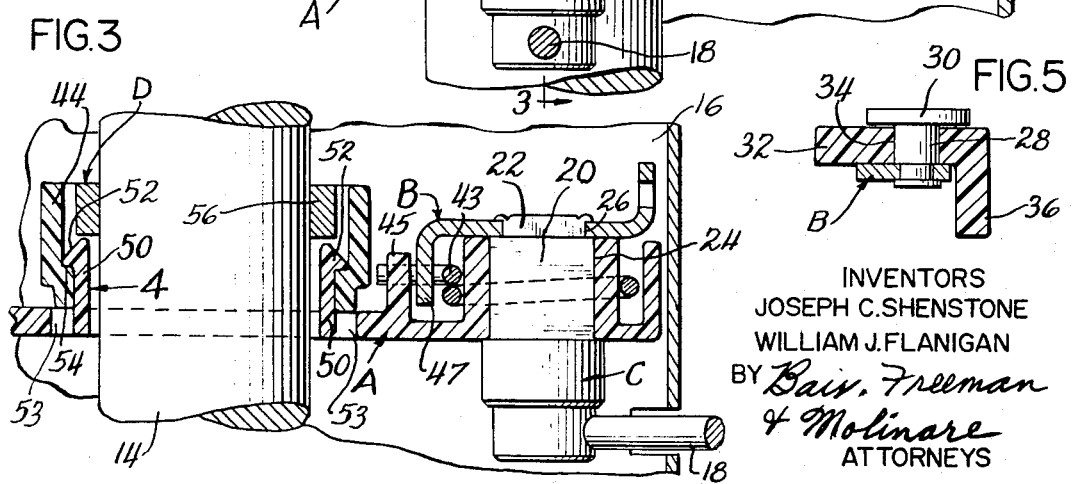

ABSTRACT OF THE DISCLOSURE

A vehicle turn-signal switch mechanism manually operated by deflecting a control handle in a selected direction thereby moving a rocker plate with respect to a fixed frame to a signaling position where the plate is held by one of two spring loaded pawls. These pawls are carried on the plate and engage with latching notches on the frame. The frame also carries a captive canceling cam ring which is coupled to rotate with the steering shaft by means of a spring steel clip which surrounds the shaft. A cam on the ring, when rotated in the appropriate direction, disengages the latched pawl from the frame notch to allow the rocker plate to return to its normal position.

Background and summary of the invention

This invention relates to a directional signal switch for automobiles and the like having a steering shaft, the device being so mounted relative to the steering shaft that when manually actuated for a right or left turn it will be automatically returned to neutral position after the turn has been made and as the steering shaft is returned to straight-away position.

One object of the invention is to provide a stationary member on which a movable member is mounted for rocking movement relative to the stationary member, pawls being provided for latching the movable member in a rocked position in either direction from centered position, and cam means being operable by steering shaft rotation to release the pawls.

Another object is to provide a normally centered movable member which returns to centered position when the pawls are unlatched, a cam member being carried by and rotatable relative to the stationary member for effecting such release of the latches, and a cam driver being mounted on the steering shaft and operatively connected with the cam member.

Still another object is to provide a cam member which is captive relative to the stationary member and comprises a ring-shaped element, the stationary member having flexible fingers relative to which the ring-shaped element may rotate, and the ring-shaped element being capable of assembly to the stationary member by snapping it past hooked ends of the flexible fingers whereupon such hooked ends overhang the ring-shaped element and retain it on the fingers.

A further object is to provide a cam driver comprising a C-shaped element formed of a strip of spring metal, one end of which has a burr that gouges into the shaft, so as to effect rotation of the C-shaped element simultaneously with the steering shaft, the C-shaped element also having a projection from its opposite end received in a recess of the cam member, the projection floating in the recess both axially and radially to effect proper operation of the cam member regardless of a considerable range of variation axially and radially as between the cam driver on the steering shaft and the cam member.

Still a further object is to provide pawls which are pivoted to the movable member and have lug-and-detent notch coaction with the stationary member, the pawls being biased to positions of coaction between the lugs and the detent notches, and being swingable both about their pivots in a normal manner and with their lugs pivoting in the detent notches for by pass of the cam means when the steering shaft is rotated in the direction signaled, normal pivoting accomplishing unlatching when the steering shaft is rotated opposite the direction signalled, and with greater unlatching movement when the movable member is held manually against return to centered position.

An additional object is to provide the pawls having slotted pivot openings coacting with their pivots to permit of such by pass swinging movement of the pawls when their lugs pivot in the detent notches.

With these and other objects in view, our invention consists in the construction, arrangement and combination of the various parts of our directional signal switch, whereby the objects above contemplated are attained, as hereinafter more fully set forth, pointed out in our claims and illustrated in detail on the accompanying drawings.

Brief description of the drawings

FIG. 1 is a cross section through a steering column and steering shaft, and includes a plan view of our directional signal switch;

FIG. 2 is an elevation looking upwardly on the sheet at FIG. 1;

FIG. 3 is a sectional view on the line 3—3 of FIG. 2;

FIG. 4 is a detail view of a flexible cam member retaining finger looking in the direction of the arrow 4 on FIG. 3;

FIG. 5 is a sectional view on the line 5—5 of FIG. 1 showing details of a pawl and pivot means therefor;

FIG. 6 is a view somewhat similar to a portion of FIG. 1 showing details of coaction between a lug of the pawl and a detent notch of a stationary member when a movable member of our directional signal switch is in normal or centered position;

FIG. 7 is a similar view showing further details of the pawl and detent notch mechanism, the pawl lug being now latched in the detent notch upon the device being operated to signal a left turn;

FIG. 8 is a similar view showing the pawl lug still latched in the detent notch, the pawl being by passed as the steering shaft is rotated for a left turn;

FIG. 9 is a similar view showing the pawl being by passed upon subsequent return of the steering shaft to straight away position, the signal switch being manually held in the left-turn signaling position;

FIG. 10 is a sectional view on the line 10—10 of FIG. 2 showing a means to normally center the movable member;

FIG. 11 is a sectional view similar to a portion of FIG. 3 showing a modified cam member driver;

FIG. 12 is a plan view of the cam ring shown in FIG. 11, and shows a projection from the cam member driver cooperating with a noth of the cam member; and FIG. 13 is a detail sectional view on the line 13—13 of FIG. 1.

Description of the preferred embodiment

On the accompanying drawings, we have used the reference character A to indicate a stationary member and B a movable member of our directional signal switch. An automobile steering shaft is shown at 14 and a steering column at 16. The stationary member A is suitably anchored in the steering column 16 and the movable member B is rockably mounted relative thereto by means of a rock shaft C having a control handle 18 to be manually actuated for signaling right or left turns. The rock shaft has a portion 20 which can rock in a bore 24 of special shape as shown in FIG. 10 and a portion 22 secured in a rectangular opening 26 of the movable member B.

The movable member B carries a pair of pivots 28 having heads 30, the pivots being riveted to the ends of the movable member B as shown in FIG. 5. Pawls 32 are pivoted on the pivots 28 and have slotted openings 34 for this purpose. The pawls are provided with lugs 36 at times to coact with detent notches 38 in the edges of the stationary member A. At the right side of FIG. 1 the position of the left-turn pawl 32 is shown dotted in order to better show one end of the movable member B carrying the pivot 28 shown in section.

Referring to FIG. 1 the left hand pawl 32 (for right hand turns) is biased conunterclockwise by a spring 40 and the right hand pawl 32 (for left hand turns) is biased clockwise by a spring 42. The movable member is normally centered by a centering spring 43 coacting with a lug 45 of the stationary member A and a lug 47 of the movable member B in a manner similar to that disclosed in the copending application of DuRocher Ser. No. 432,-768, filed Feb. 15, 1965, now Patent No. 3,300,601.

A ring-like cam member 44 is provided as shown in FIG. 1 having a pair of cam lobes 46 and 48. The cam member 44 is supported by and is captive relative to the stationary member A, and is rotatable relative thereto. The manner of support comprises four flexible fingers 50 having hooked upper ends 52 as shown in FIGS. 3 and 4. The stationary member A is made of plastic material having sufficient flexibility to permit the fingers 50 to be sprung radially inward when the ring-like cam member 44 is assembled relative to the stationary member. This is accomplished by forcing the cam member 44 downwardly over the hooked upper ends 52 of the fingers 50 until an annular shoulder 54 springs past the ends 52 and the fingers then assume their initial positions relative to the member A as shown in FIG. 3 holding captive the cam member 44 but permitting its rotation relative to the stationary member A. To provide the desired degree of resiliency the fingers 50 may be partially separated by notches 51 from the stationary member A as shown in FIG. 4, and by slots 53 shown in FIG. 3.

The cam member 44 must rotate simultaneously with the steering shaft 14. An operative connection is provided between the two in the form of a cam driver B of spring steel comprising a C-shaped portion 56 and a lateral projection 58 received in a slot 60 of the cam lobe 46. The projection-slot connection 58, 60 permits both radial play (see FIG. 1) and axial play (see FIG. 13) of the projection in the slot to take care of variations in tolerances. The C-shaped portion 56 is provided at its end with a burr 62 shown in FIG. 1 which may be formed by shearing the strap of metal to length from which the cam driver D is formed prior to hardening the cam driver. The cam driver is installed by pushing it down over the steering shaft 14 until it reaches the proper place axially thereof whereupon it is retained by the inherent spring of the metal against both further axial movement and radial movement relative to the steering shaft.

In FIGS. 11 and 12 we show a modification wherein a cam member 44ᵃ is driven by a pin 64 projecting directly from the hub 66 of a steering wheel and entering a notch 68 of the cam 44ᵃ. This design of cam drive is more suitable for some makes of automobiles.

We have not gone into detail with respect to a "SWITCH MECHANISM" to be actuated by the movable member B but such mechanism is indicated in FIGS. 1 and 2. It may be of the type shown in the DuRocher application hereinbefore referred to.

*Practical operation*

In the operation of our directional signal switch, the movable member B when tilted counterclockwise as indicated by the arrow 70 to indicate a left-hand turn will appear as in FIG. 7. Comparing this Figure with FIG. 6, it will be noted the lug 36 has slid upwardly along the right side of the stationary member A and seated in the detent notch 38. The spring 42 tends to hold the lug thus seated and to keep the slot 34 extending downwardly from the pivot 28.

As the steering shaft 14 is rotated counterclockwise (see FIG. 8) the cam lobe 46 will engage the pawl 32 and swing it against the bias of the spring 42 with the lower end of the lug 36 pivoting in the notch 38, the slot 34 permitting such movement, and the cam lobe will by pass the pawl whereupon the pawl will swing back to the position shown in FIG. 7. The pawl has not released the movable member *b* but is now ready to be actuated to release it when the steering shaft 14 is subsequently rotated clockwise as indicated by the arrow 72 in FIG. 9. It will be noted the cam lobe 46 is rocking the pawl 32 counterclockwise about the pivot 28. However this figure illustrates the movable member B being held manually in the left turn position. Accordingly the cam lobe 46 will pass the pawl 32 and the pawl will again latch with its lug 36 in the detent notch 38.

However, if the movable member B is not held manually (when the lever 18 is released in the normal manner after signalling a turn) the movement of the lug 36 out of the notch 38 will permit the movable member B to be brought back to centered position as shown in FIG. 6 upon about half the pawl movement illustrated (as soon as lug 36 is out of notch 38). When the movable member B is manually held, the pawl movement pivoting about 28 will be greater as illustrated in FIG. 9 and thus the pawl is by passed or released depending on whether the member B is held or not held. Accordingly, proper operation without strain on the parts is accomplished in either case.

The modification shown in FIGS. 11 and 12 may be used where it is more convenient to actuate the cam member 44ᵃ from the steering wheel itself rather than from the steering shaft.

From the foregoing specification it will be obvious that we have provided a cancelling cam construction wherein a comparatively simple cam driver is readily installed with respect to the steering shaft and coacts with a captive cam of the assembly to rotate the cam and permit radial and axial variations due to the projection and slot connection as between the cam driver and the cam itself. The cam is readily assembled by forcing it into position on the stationary member of the assembly and thereafter remains captive but in such manner that it may rotate relative to the stationary member. Effective pawl and detent notch means is provided for latching the turn signal in turn indicating position and unlatching and by pass of the cam relative to the pawl are accomplished in a novel manner designed to take care of all situations such as normal release of the turn signal after operation or during a holding operation when desired.

Some changes may be made in the construction and arrangement of the parts of our directional signal switch without departing from the real spirit and purpose of our invention, and it is our intention to cover by our claims any modified forms of structure or use of mechanical equivalents which may reasonably be included within their scope.

We claim as our invention:

1. A manually activated vehicle turn-signal switch of the class adapted for mounting adjacent a rotatable steering shaft and comprising, in combination, a canceling cam mounted for rotation with said steering shaft, a switch mounting frame, a switch release pawl movably mounted on said frame and having a portion thereof extending inwardly toward said shaft, said extending portion of said release pawl being positioned in the path of said cam whenever said switch is activated and being operable to deactivate said switch when said shaft carries said cam past said extending portion in a first direction, wherein the improvement comprises, in combination, a ring retained by and rotatable relative to said frame for carrying said canceling cam, said cam being rigidly affixed to and projecting radially outward from said ring, a groove in said ring, and a tongue rigidly affixed to and extending radially outward from said shaft into said groove for rotating said ring when said shaft is rotated, said tongue being movable axially of said steering shaft with respect to said groove while maintaining engagement with said groove to permit axial variation of the position of said tongue with respect to said frame.

2. The improvement as set forth in claim 1 wherein said ring is retained for rotation on said frame by means of axially aligned flexible fingers having hooked ends, said hooked ends being adapted to flex around and snap over said ring as it is pressed against said frame.

3. The improvement as set forth in claim 1 wherein said tongue is rigidly affixed to one end of a C-shaped spring steel snap ring which surrounds and is clamped to said steering shaft.

4. A manually activated turn-signal switch of the class comprising, in combination, a stationary frame mounted adjacent a vehicle steering shaft, a control lever, a switch actuating member coupled to said control lever and mounted for rocking motion on said frame, at least one latching notch on said frame, at least one pawl member movably mounted on said switch actuating member, a spring for forcing said pawl member into engagement with said notch to hold said switch actuating member in a latched position, and a canceling cam mounted for rotation with said shaft, said cam being operative to engage with and release said pawl member from said notch when said cam is carried in a first direction past said pawl member by said steering shaft, the improvement wherein said pawl member includes an arcuate closed slot therethrough and wherein said pawl member is mounted on said switch actuating member by means of a stud affixed to said switch actuating member passing through said slot, said slot being shaped to permit said pawl to pivot about the bearing point between said pawl member and said notch against the force provided by said spring when said cam engages with said pawl member and moves in a direction opposite to said first direction.

5. The improvement as set forth in claim 4 wherein said spring supplies a tension force to said pawl directed along a line passing between said notch and said bearing point.

6. A manually activated turn-signal switch of the class comprising, in combination, a stationary frame mounted adjacent a vehicle steering shaft, a control lever, a switch actuating member coupled to said control lever and mounted for rocking motion on said frame, at least one latching notch on said frame, at least one pawl member movably mounted on said switch actuating member, a spring for forcing said pawl member into engagement with said notch to hold said switch actuating member in a latched position, and a canceling cam mounted for rotation with said shaft, said cam being operative to engage with and release said pawl member from said notch when said cam is carried in a first direction past said pawl member by said steering shaft, wherein the improvement comprises, in combination, a ring retained by and rotatable relative to said frame for carrying said canceling cam, said cam being rigidly affixed to and projecting radially outward from said ring, a groove in said ring, a tongue rigidly affixed to and extending radially outward from said shaft into said groove for rotating said ring when said shaft is rotated, said tongue being movable axially of said steering shaft with respect to said groove to permit axial variation of the position of said tongue with respect to said frame, and wherein said pawl member includes an arcuate closed slot therethrough and wherein said pawl member is mounted on said switch actuating member by means of a stud affixed to said switch actuating member passing through said slot, said slot being shaped to permit said pawl to pivot about the bearing point between said pawl member and said notch against the force provided by said spring when said cam engages with said pawl member and moves in a direction opposite to said first direction.

References Cited

UNITED STATES PATENTS

| | | | |
|---|---|---|---|
| 2,739,196 | 3/1956 | Spicer | 200—61 |
| 2,815,412 | 12/1957 | Spicer | 200—61 |
| 3,065,650 | 11/1962 | Brown | 74—567 |
| 3,254,169 | 5/1966 | Fuqua | 200—61 |
| 3,271,540 | 9/1966 | White | 200—61 |

BERNARD A. GILHEANY, *Primary Examiner.*

H. BROOME, *Assistant Examiner.*